3,232,803

CHEMICAL ETCHING OF TUNGSTEN

Gordon D. Barnett, Long Beach, and Arnold Miller, Fullerton, Calif., assignors to North American Aviation, Inc.

No Drawing. Filed Apr. 16, 1963, Ser. No. 273,276
3 Claims. (Cl. 156—18)

This invention relates to chemical etching of surfaces of tungsten.

There are numerous occasions in the metallurgy of tungsten requiring chemical etching of the surface of a tungsten body. Among these are: cleaning of a tungsten surface prior to a welding operation, for example; achievement of epitaxial overgrowths of controlled structure upon a tungsten substrate, and elucidating metallurgical structure, e.g., to reveal dislocations, to resolve individual etch pits in subgrain boundaries of single-crystal tungsten, to reveal the grain structure in polycrystalline tungsten, e.g., arc cast, and to make slip lines in mechanically deformed tungsten, e.g., swaged, more manifest. Especially for purposes of examination of grain structure, an etching process should have the attributes of being so controllable that the etching proceeds to a predetermined extent which will emphasize the structural characteristics of the tungsten to be examined.

It is a general object of this invention to provide an improved chemical etching process of tungsten for purposes of the above-mentioned character.

Etchants used heretofore for tungsten, e.g., a solution of copper sulphate and ammonium hydroxide, do not attain the exacting results which have become more and more necessary as the science of tungsten metallurgy has developed.

Briefly stated, the process of this invention comprises contacting the tungsten metal to be etched with gaseous tungsten hexafluoride under controllable conditions for obtaining predetermined results. Conjecturing, it seems that the tungsten hexafluoride reacts with the tungsten of the mass being treated to form volatile lower fluorides of tungsten. It has been assumed by the technical community that tungsten has only one stable fluoride, i.e., the hexafluoride ($WF_6$), and hence, the hexafluoride would more reasonably be considered as a candidate for use in tungsten deposition rather than for etching tungsten.

Prior to subjecting the tungsten to an etching operation of the process of this invention, it is preferred to smooth the surface of the tungsten to be etched and to clean it to remove tungsten oxide and other contaminants. Such smoothing and cleaning preparation may include a polish with a 6 micron diamond wheel, an ethyl alcohol wash to remove loosened tungsten particles and contaminants from the polish wheel, a rinse in boiling distilled water, and an air dry. Under high magnification, the resulting mirror-like surface lacks structural character except for random polish marks.

The invention will be illustrated in greater detail by description in connection with the following specific examples of the practice of it.

*Example I*

A specimen of tungsten to be etched according to the process of this invention had one surface thereof polished and cleaned according to the above described smoothing and cleaning procedure. The tungsten specimen used in this example was a single-crystal wafer, described by the supplier (Crystal Products Department of the Linde Company, New York, N.Y.) as being of five-degrees lineage and undesignated surface orientation. The tungsten wafer was placed in a wire basket of tungsten, and the basket was suspended by a glass hook in a reaction vessel of quartz. An induction coil was arranged in encircling relationship around the reaction vessel. The vessel was connected to a vacuum pump and to a source of tungsten hexafluoride of 99.5 percent purity.

The reaction vessel was evacuated to about $5\times10^{-7}$ torr, such pressure being measured with calibrated ionization gauges. The induction coil was energized and regulated and the tungsten wafer was thereby heated to about 1200 degrees C., such temperature being measured with an optical pyrometer. When the pressure in the reaction vessel became stable at about $5\times10^{-7}$ torr, the temperature of the tungsten wafer was lowered to about 1000 degrees C. Thereupon, commercially pure tungsten hexafluoride (99.5 percent) was introduced and continuously flowed into the reaction vessel for a period of about two hours at a flow rate established by means of a pressure drop across a metering tube of known conductance, i.e., through a cylindrical metering tube of one millimeter diameter and 4.5 centimeters long, producing a concentration of tungsten hexafluoride at a pressure of about 100 microns of mercury at the tungsten surface. Throughout the etching period the temperature of the tungsten wafer was maintained at about 1000 degrees C. Total etch of about 2 mils occurred at the polished tungsten surface, as measured with an electronic gauge. Thus the etching rate was about 1 mil per hour. Following the etching operation, the induction coil was de-energized, and while the reaction vessel was still under vacuum conditions it was allowed to cool to room temperature.

When the thus etched tungsten wafer reached room temperature it was removed from the reaction vessel and subjected to metallographic examination. Under optical examination crystallographic markings characteristic of the surface orientations were revealed. Subgrain boundaries and areas of polycrystallinity which existed in the specimen were also brought out sharply by the etch.

*Example II*

The etching procedure of Example I was followed except that the tungsten specimen was a single-crystal rod supplied by the Materials Research Corporation, Yonkers, New York, the rod having the flat surface thereof aligned 12 degrees to 15 degrees to the (110) plane. Substantial etching occurred which upon metallographic examination revealed crystallographic markings characteristic of the surface orientations, and subgrain boundaries and areas of the existing polycrystallinity were also brought out sharply.

As mentioned above, the rate and extent of etching of a surface of tungsten according to the process of this invention are controllable. Such control is effected through interrelation of the ultimate parameters of the temperature at which the reaction between tungsten hexafluoride and the tungsten occurs, and the concentration of tungsten hexafluoride at the tungsten surface.

An increase in temperature of the tungsten surface being etched causes an increase in the etching rate. Temperatures as low as 200 degrees C may be used in the practice of this invention. Lower temperatures would cause the etching rate to be too slow for practical purposes. A practical upper limit for the temperature at which the tungsten surface may be heated during etching is 1400 degrees C., as temperatures above that figure would increase the rate of reaction beyond that at which an operator could conveniently control the rate of the etching process. With respect to heating of the tungsten surface prior to etching, it is preferred to heat the tungsten to about 200 degrees C. higher than the contemplated etching temperature, thus to insure removal of contaminants which might otherwise cause deleterious effects, e.g., etch pits, to occur during the etching operation.

With respect to the factor of concentration of tungsten hexafluoride as a variable affecting the efficiency of the process of this invention, such concentration is herein referred to in terms of pressure of the reactant, tungsten hexafluoride. Using temperatures in the range of from 200 degrees C. to 1400 degrees C., the range of pressures for the tungsten hexafluoride at the tungsten surface being etched should be from 10 microns to about 10 millimeters. Lower pressures result in an impractically slow operation, while higher pressures cause the reaction to proceed too fast for an operator to conveniently control the process.

Another facet of the matter of concentration of the tungsten hexafluoride is that of the presence of other constituents. Obviously, such contaminants which would react with the tungsten or the tungsten hexafluoride, or cause deposits to form on the tungsten surface should be avoided. As to inert constituents in the tungsten hexafluoride, e.g., argon, helium and nitrogen, this is a parameter which affects the etching process of this invention quantitatively but not qualitatively.

Evacuation of the reaction chamber is done for the purpose of removing possible contaminants from the reaction zone. Pressures of the order set forth in Example I hereinabove are satisfactory, and greater extents of evacuation afford even more assurance of avoidance of contaminants, but as prerequisite, the background pressure in the reaction vessel should be at least lower than that of the reactant, tungsten hexafluoride.

Etching may be accomplished according to this invention simultaneously on more than one surface of a mass of tungsten. There is no limitation on the types and sizes of the tungsten material which may be etched by the process of this invention. The process may be performed to provide selected etched areas, as by appropriate masking procedures.

There is no criticality in the means for effecting heating of the tungsten being etched. Various types of heating means may be employed such as resistance heating, electron beam heating, as well as the induction heating used in the above examples.

In view of the foregoing, it is clear that the parameters of pressure, temperature, flow-rate of tungsten hexafluoride, purity of the tungsten hexafluoride, as variables affecting the efficiency of operation of the process of this invention are interrelated and are of significance only when considering the extent and rate of etching for subsequent metallographic examination, and for preparing the tungsten surface to the desired degree of chemical purity as for epitaxial growth of tungsten upon a tungsten substrate by vapor deposition.

It will be understood that it is intended to cover all changes and modifications of the examples of the invention herein chosen for purposes of this disclosure, which do not constitute departures from the spirit and scope of the invention.

Having described the invention, what is claimed is:

1. The process of etching a tungsten surface on a body, comprising the steps of placing said body in a reaction vessel, evacuating the vessel to a predetermined pressure, heating said surface to a temperature of from 200 to 1400 degrees C. and while maintaining said temperature, introducing into the reaction vessel a supply of tungsten hexafluoride to provide a pressure of the hexafluoride in the reaction vessel of from 10 microns to 10 millimeters, thereby to etch said tungsten surface for revealing the metallurgical structure of a single crystal of said tungsten surface, said predetermined pressure being less than that of the hexafluoride.

2. The process of claim 1 in which said tungsten body is smoothed and cleaned prior to placing the same in said reaction vessel.

3. The process of claim 1 in which said tungsten body is preheated to a temperature above the temperature to which the surface is heated and less than a temperature for changing the physical state of the tungsten surface and body prior to introduction of said hexafluoride.

References Cited by the Examiner

UNITED STATES PATENTS

| | | | |
|---|---|---|---|
| 3,139,658 | 7/1964 | Brenner et al. ----- | 117—107.2 |
| 3,171,755 | 3/1965 | Reuschel et al. ----- | 156—17 X |

ALEXANDER WYMAN, *Primary Examiner.*

JACOB STEINBERG, *Examiner.*